Dec. 11, 1956 J. B. CANNON, JR 2,773,648

BINARY-DECIMAL COUNTER

Filed April 5, 1952 2 Sheets-Sheet 1

INVENTOR.
John B. Cannon, Jr.
BY
Brown, Critchlow, Flick & Peckham
His Attorneys Dec. 11, 1956 J. B. CANNON, JR 2,773,648

BINARY-DECIMAL COUNTER

Filed April 5, 1952 2 Sheets-Sheet 2

INVENTOR.
John B. Cannon, Jr.
BY
Brown, Critchlow, Flick & Peckham
His Attorneys United States Patent Office 2,773,648

Patented Dec. 11, 1956

2,773,648

BINARY-DECIMAL COUNTER

John B. Cannon, Jr., State College, Pa., assignor, by mesne assignments, to Research Corporation, New York, N. Y., a corporation of New York Application April 5, 1952, Serial No. 280,795

23 Claims. (Cl. 235—92)

This invention relates to an improvement in counters, and more particularly, to a counter that will count in either the binary or decimal system of numeration.

It is among the objects of this invention to provide a counter of the foregoing type that will operate electrically to count any predetermined number of electrical impulses in an impulse receiving circuit and that will then automatically reset itself to perform another sequence of counting operations.

In accordance with this invention, the counter comprises a plurality of sets of relays, the first set being connected in the impulse receiving circuit and operating in response to current pulses therein, and each succeeding set of relays operating in response to independent pulses generated by the immediately preceding set. In each set, the counting or impulse relays are arranged to operate in cyclic sequence by means of holding and control relays in that set; and the several sets are arranged to count in accordance with the binary system of numeration. Provision is made, however, for optionally resetting the system after each tenth pulse in the impulse receiving circuit, thereby adapting the counter to decimal numeration. In addition, a decoder circuit is included in the system for translating the total count at any given moment from binary to decimal form.

Figure 1:
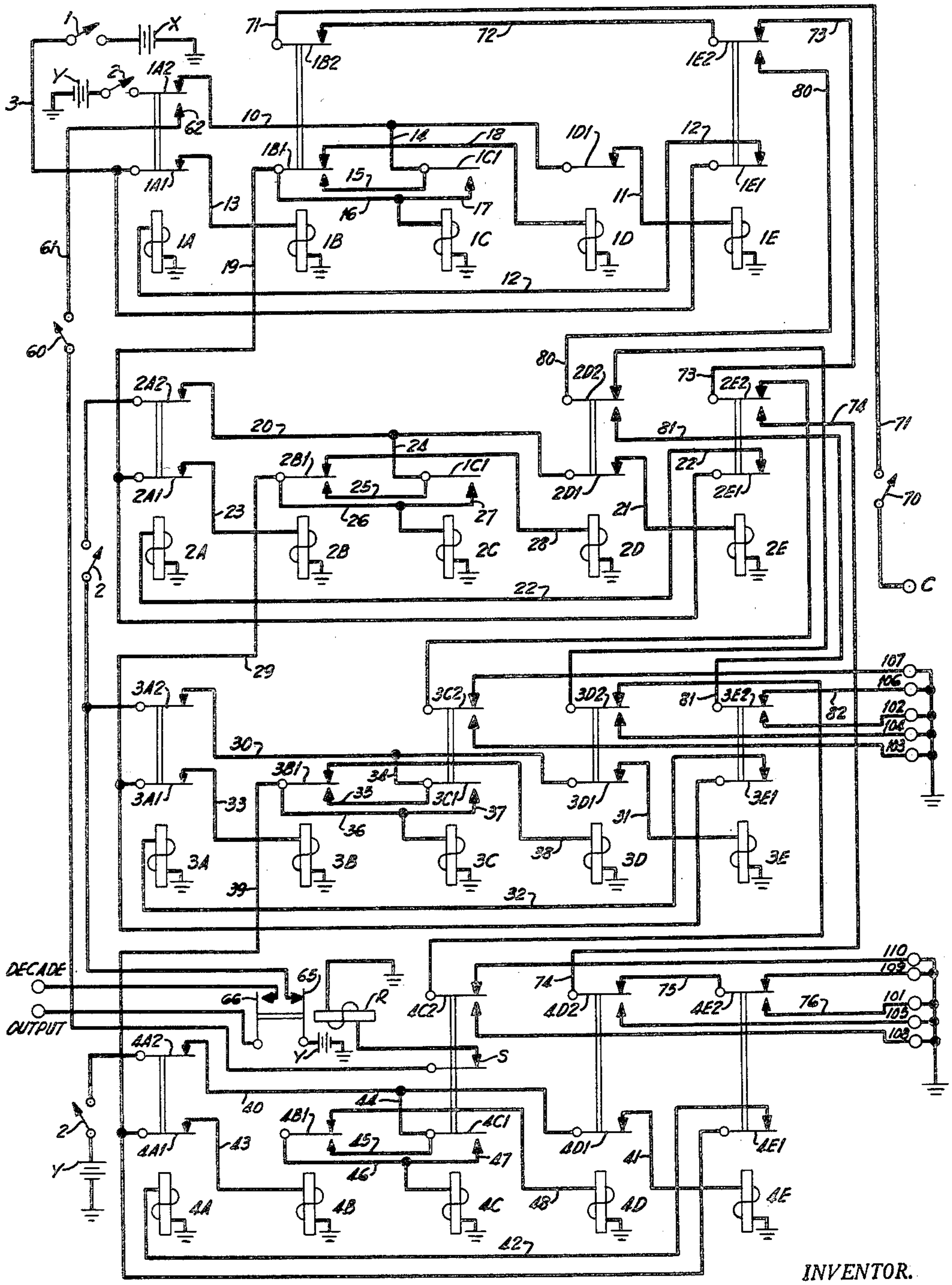
Figure 2:
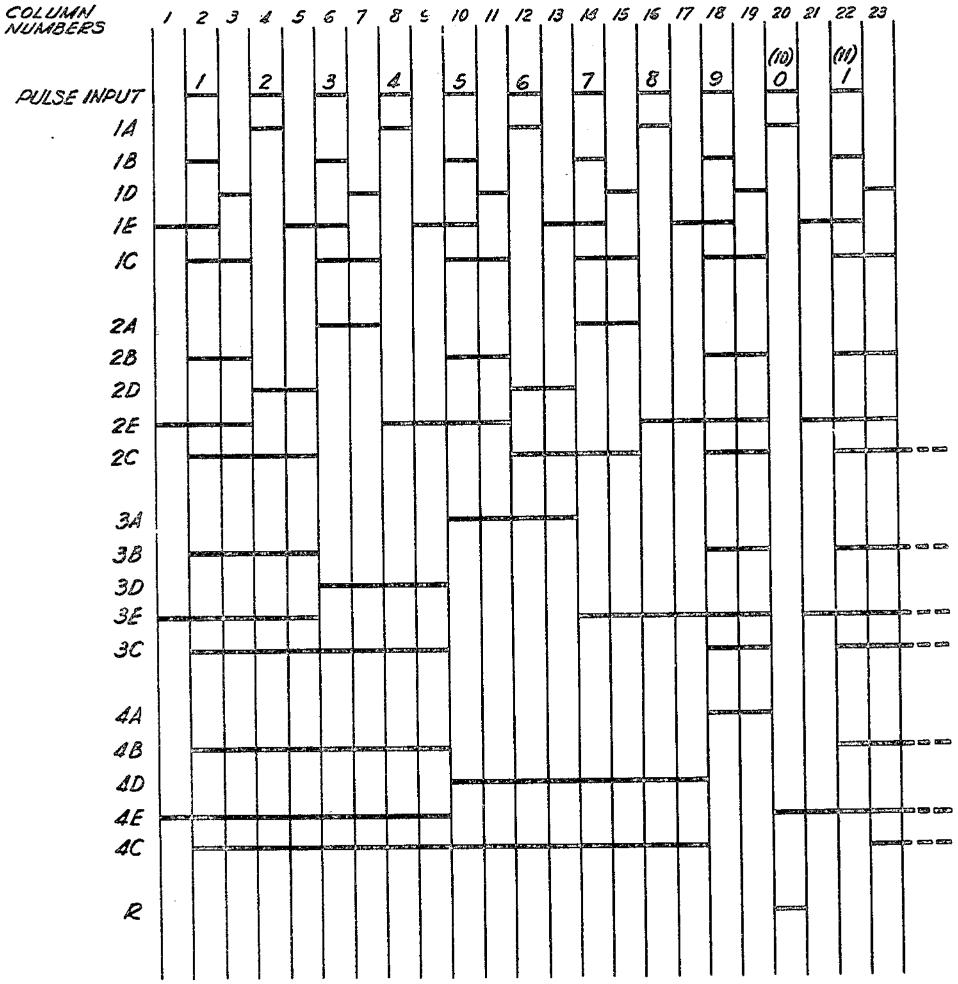

In the accompanying drawings, Fig. 1 is a circuit diagram of a counter capable of counting up to sixteen operations in the binary system and up to ten in the decimal system. As explained below, a counter capable of counting a greater number of operations requires only an extension or duplication of the circuits here shown. Fig. 2 is a chart showing the configuration of all of the relays in Fig. 1 before, during and after each of eleven operations being counted.

Referring to Fig. 1, several circuits are shown, one is an impulse receiving circuit, which includes a source of current X, a pulsing switch 1, and two counting or impulse relays 1A and 1B. The other circuit is a control circuit, which includes a source of current Y, a control switch 2, and all of the other relays in the system. For convenience in drawing the circuit diagram, the control circuit has been split into several parts, each having a source of current Y and a control switch 2, but they are clearly the equivalent of a single circuit and are so regarded herein. In all of the circuits, each current source is represented by a battery, one terminal of which is grounded and the other connected to a live conductor.

For the purposes of this disclosure, the successive manual closings of the pulsing switch 1 represent the operations to be counted; but it will be understood that this switch can, of course, be made responsive to the occurence of any other operations to be counted. Each successive closing of that switch causes a pulse of current to flow in the impulse receiving circuit that will energize one or the other of the impulse relays 1A and 1B, depending on the configuration (i. e., whether energized or released) of a holding relay 1C and two control relays 1D and 1E, which together with the two impulse relays make up the first set of relays in the system. Each of the relays in the first set, as well as in succeeding sets, includes an energizing coil, and one or more switches having an armature and a normally open or closed contact. Where there is more than one switch associated with any relay, their armatures are mechanically linked together. All of the relays shown in Fig. 1 are represented in their released configurations, which are assumed when no current is flowing through the coil of any relay.

When all of the switches 2 are closed to apply a potential to the divided control circuits, all of the relays assume their initial configuration in preparation for counting the first pulse in the impulse receiving circuit. Considering the initial configuration of the first set of relays alone, current flows from the battery Y in the upper left corner of Fig. 1 through the upper switch 1A2 of relay 1A to conductor 10, and then through normally closed switch 1D1 of relay 1D to a conductor 11 connected to the energizing coil of relay 1E. That relay is accordingly energized and its normally closed lower switch 1E1 is opened. As will be clear from the circuit diagram, none of the other relays in the first set is energized at this time.

The initial and subsequent configurations of all relays, including those in the first set, are shown graphically by the chart in Fig. 2. The first column of the chart shows the initial configuration of all relays after the switches 2 are closed but before the first pulse input is delivered to the impulse receiving circuit. The second and each subsequent even-numbered column shows the configuration of all relays during the period of the first pulse input and subsequent pulse inputs, respectively, in the impulse receiving circuit. The remaining odd-numbered columns show the configuration of all relays after the preceding pulse input has ended. A transverse line in any column of the chart opposite a designated relay indicates that relay is energized during the period indicated by the position of the line relative to the input pulse train near the top of the chart.

When pulsing switch 1 is now closed to deliver the first pulse of current to the impulse receiving circuit, that current flows through conductor 3 and the lower normally closed switch 1A1 of relay 1A to conductor 13 connected to the energizing coil of relay 1B. No current flows to the coil of relay 1A, because the circuit thereto is broken by open switch 1E1 of relay 1E, which remains open for the duration of the first pulse input. Since relay 1B is now energized, its lower switch 1B1 has its lower contact closed, so that current now flows in the control circuit through conductors 10, 14, 15, and 16 to the energizing coil of relay 1C. As that relay is energized, its normally open switch 1C1 is closed connecting conductor 14 directly with the energizing coil of relay 1C through conductor 17, thereby supplying that relay with an additional path to the source of current in the control circuit. Accordingly, during the period when the first pulse input is flowing in the impulse receiving circuit, relays 1B, 1C and 1E are all energized as shown by the transverse lines in the second column of the chart in Fig. 2.

When the first pulse input ends with the opening of pulsing switch 1, relay 1B is immediately released; but relay 1C remains energized as a holding relay through the alternate circuit path established by conductors 14 and 17 through closed switch 1C1. In addition, control relay 1D is now energized for the first time by current in the control circuit flowing in conductors 17, 16 and 18 through switch 1B1. As soon as relay 1D is energized, its normally closed switch 1D1 opens to break the control circuit leading to the coil of relay 1E, which is thereby released and its lower switch 1E1 returned to its normal closed position. In that position, impulse relay 1A is now connected in the impulse receiving circuit through conductors 3 and 12, and is ready to respond to the next pulse input. In the period between the first and second pulse inputs, only relays 1D and 1C in the first set of relays remain energized, as shown by the third column of the chart in Fig. 2.

When the second pulse input occurs with the second closing of pulsing switch 1, impulse relay 1A is energized by current flowing in conductors 3 and 12, as previously stated, thereby opening its normally closed lower switch 1A1. The opening of that switch disconnects the coil of impulse relay 1B from the impulse receiving circuit so that relay 1B cannot be energized at the same time as relay 1A. With the energizing of relay 1A, its upper switch 1A2 is also shifted to open the circuits connected to conductor 10, so that relays 1C and 1D are released and their associated switches returned to their normal positions. Accordingly, during the period of the second pulse input, only relay 1A in the first set of relays is energized, as indicated by the fourth column of the chart in Fig. 2.

When the second pulse input ends on the opening of pulsing switch 1, the configuration of each relay in the first set is again the same as before the first pulse input. As relay 1A is released, its two switches return to their normal positions, and control relay 1E is again energized, opening its switch 1E1 to again disconnect relay 1A from the impulse receiving circuit. All of the other relays in the first set are in their released positions, as indicated by the fifth column in the chart.

As successive pulses are delivered to the impulse receiving circuit, relays 1A and 1B are alternately energized and deenergized in cyclic sequence, and all of the other relays in the first set repeat the operations described above. From this it will be understood that relays 1A and 1B each count alternate pulses, i. e., they count up to two, are reset, and then repeat the same operation indefinitely.

For counting to numbers higher than two, any number of sets of relays similar to the first set may be cascaded. A circuit of the type shown in Fig. 1 with four such sets will count sixteen pulses, each count being represented by a different configuration of released and energized relays, before all of the relays return to their initial condition. For example, during the first (and during every other odd-numbered) pulse, the lower switch 1B1 of relay 1B is connected to the control circuit through conductors 10, 14 and 15; and during that period the control circuit delivers a pulse of current to a second set of relays 2A to 2E, inclusive, through conductor 19 connecting the switch 1B1 with switches 2A1 and 2E1 in the second set of relays, which will receive one pulse for every other pulse received by the first set. A third set of relays 3A to 3E, inclusive, being similarly connected to the second unit by conductor 29, advances one count for every fourth input pulse to the first set. A fourth set of relays 4A to 4E, inclusive, in a like manner advances one count for every eight pulses received by the first set. In other words, each additional set of relays doubles the capacity of the counter as a whole.

The actual operation of the successive sets of relays can be easily followed from the detailed description already given about the operation of the first set, because all of the relays in the second and subsequent sets are connected in the same way and operate in the same manner as those in the first set. For convenience, the various elements in the second and subsequent sets of relays are numbered to have the same final digit as like elements in the first set. It is believed that, with the aid of the chart in Fig. 2, the operation of these additional sets of relays in the circuit diagram will be entirely clear without further explanation. It will be understood, of course, that still more sets of relays could be added to those shown in Fig. 1 for counting any predetermined number of operations in the binary system, and that such further sets would be connected in the system in the same manner as the successive sets shown in Fig. 1.

In order to adapt the system to counting in decimal form, a decade resetting relay R and a resetting switch S associated with relay 4C are provided for the purpose of resetting the entire system to its initial or zero configuration on every tenth pulse delivered to the impulse receiving circuit by pulsing switch 1. Means are also provided in the form of additional switches associated with two or more relays in each set for translating the total count at any given time from binary to decimal form.

To use the counter for counting in the decimal system, the operator closes a switch 60 in series with a conductor 61, which is connected to the lower normally open contact 62 of the upper switch 1A2 associated with relay 1A. Current will then flow from the control circuit battery Y through conductor 61 and switch S to the coil of relay R when, and only when, relay 1A is energized (closing contact 62) at the same time that relay 4C is in its released position (switch S closed). It will be apparent from the chart in Fig. 2 that those coincident conditions occur only on the tenth pulse in the impulse receiving circuit, because relay 4C is energized (and switch S is open) from the start of the first pulse input until the start of the ninth pulse input, and relay 1A is not energized thereafter until the start of the tenth pulse input. When relay R is energized, it opens a normally closed switch 65 associated with that relay, thereby opening the control circuit between the second and third sets of relays and their source of current Y (located adjacent to relay R in the drawing). The opening of that circuit releases all of the relays in those two sets, as well as relay 4A in the fourth set (as relay 4A releases, relay 4E is energized from a separate current source in the divided control circuit). The various relays now have the configuration shown in column 20 of the chart. When relay R releases in turn at the end of the tenth pulse by the return of switch 1A2 to its normal position, the second and third sets of relays return to their initial positions. The fourth set of relays is already in that condition and the first set returns to that condition in its natural sequence of operation. Accordingly, the entire system is returned to its initial condition at the end of the tenth pulse input (see column 21 of the chart), and subsequent pulses thereafter will be counted in the same manner as above described.

Whenever relay R is energized during the tenth pulse input, a second switch 66 associated with that relay closes a circuit labeled "decade output" in Fig. 1, which can be used to generate an independent pulse of current for operating another decimal counter similar to that shown in Fig. 1. In this second or tens counter the switch 66 performs the same pulsing function as switch 1 in the unit counter shown. Additional decimal counters can be similarly cascaded to count hundreds and thousands, etc. in the decimal system.

When using the counter for counting in the decimal system, a decoding circuit is provided to translate the total count at any given moment from binary to decimal form and to register that count. This decoding circuit is controlled by a switch 70 (on the right hand side of Fig. 1) and by additional switches associated with two or more relays in each set of the unit counter shown in Fig. 1. For example, at the end of the first pulse input, the relays that are energized are 1C, 1D, 2B, 2C, 2E, 3B, 3C, 3E, 4B, 4C and 4E (see column 3 of the chart in Fig. 2). If switch 70 is closed, current then flows from a battery Y in the decoding circuit along the following path: through a conductor 71, switch 1B2 (its armature is up), a conductor 72, switch 1E2 (its armature is up), a conductor 73, switch 2E2 (its armature is down), a conductor 74, switch 4D2 (its armature is up), a conductor 75, switch 4E2 (its armature is down), and a conductor 76 to an appropriate indicator, such as a panel light 101, representing a unit count of one.

To take another example, at the end of the sixth pulse input (see column 13 of the chart in Fig. 2) the following relays in the first three sets are energized: 1E, 2C, 2D and 3A. Current now flows in the decoding circuit from current source Y along the same path previously described until it reaches switch 1E2 (its armature is now down); from there it takes the following path: through a conductor 80, switch 2D2 (its armature is down), a conductor 81, switch 3E2 (its armature is up), and a conductor 82 to a panel light 106. With the aid of the chart in Fig. 2, it is not difficult to follow the decoding circuit for the other configurations of the relays at the end of each pulse input to show that, at the end of each successive pulse input corresponding to counts from one to ten, panel lights 101 to 110, respectively, will be lit.

It is among the advantages of this invention that the counter may be used to count in either the binary or decimal system, and that the pulse inputs counted may be of various lengths and be separated by widely different intervals, the speed of counting being limited only by the characteristics of the relays used.

According to the provisions of the patent statutes, I have explained the principle of my invention and have illustrated and described what I now consider to represent its best embodiment. However, I desired to have it understood that, within the scope of the appended claims, the invention may be practiced otherwise than as specifically illustrated and described.

I claim:

1. A counter for counting electrical impulses in an impulse receiving circuit, comprising a plurality of interconnected electrical relays including a pair of impulse relays and a holding relay and a pair of control relays, each relay having an energizing coil and at least one switch that occupies a released position when the coil is deenergized and an energized position when the coil is energized, a control circuit, the coil of the holding relay being initially connected in the control circuit through a switch of the first impulse relay in its released position and through a switch in series therewith of the second impulse relay in its energized position and thereafter remaining connected in the control circuit in holding circuit relation through its own switch in its energized position and through a switch in series therewith of the first impulse relay in its released position, the coil of the first control relay being connected in the control circuit through a switch of the second impulse relay in its released position and through a switch in series therewith of the holding relay in its energized position, the coil of the second control relay being connected in the control circuit through series connected switches of the first impulse relay and the first control relay in their released positions, the coil of the first impulse relay being connected in the impulse receiving circuit through a switch of the second control relay in its released position, and the coil of the second impulse relay being connected in the impulse receiving circuit through a switch of the first impulse relay in its released position, whereby the impulse relays will be energized alternately in cyclic sequence completing one cycle upon the occurrence of every alternate electrical impulse in the impulse receiving circuit.

2. A counter for counting electrical impulses in an impulse receiving circuit, comprising at least four sets of interconnected electrical relays, each set including a pair of impulse relays and a holding relay and a pair of control relays, each relay having an energizing coil and at least one switch that occupies a released position when the coil is deenergized and an energized position when the coil is energized, a control circuit, the coil of the holding relay in each set being initially connected in the control circuit through a switch of the first impulse relay in the same set in its released position and through a switch in series therewith of the second impulse relay in the same set in its energized position and thereafter remaining connected in the control circuit in holding circuit relation through its own switch in its energized position and through a switch in series therewith of the first impulse relay in the same set in its released position, the coil of the first control relay in each set being connected in the control circuit through a switch of the second impulse relay in the same set in its released position and through a switch in series therewith of the holding relay in the same set in its energized position, the coil of the second control relay in each set being connected in the control circuit through series connected switches of both the first impulse relay and the first control relay in the same set in their released positions, the coil of the first impulse relay in the first set being connected in the impulse receiving circuit through a switch of the second control relay in the same set in its released position, and the coil of the second impulse relay in the first set being connected in the impulse receiving circuit through a switch of the first impulse relay in that set in its released position, whereby the impulse relays in the first set will be energized alternately in cyclic sequence and will complete one cycle upon the occurrence of every alternate electrical impulse in the impulse receiving circuit, a separate cycle impulse generating means in each set of relays except the last set, the generating means in each set including an electrical circuit and a switch of one of the relays in the same set that is closed on the completion of each cycle in that set, the coil of the first impulse relay in the second and subsequent sets being connected to the generating means in the preceding set through a switch of the second control relay in its released position in the same set as said first impulse relay, the coil of the second impulse relay in the second and subsequent sets being connected to the generating means of the preceding set through a switch of the first impulse relay in its released position in the same set as said second impulse relay, whereby the impulse relays in the second and each subsequent set will be energized alternately in cyclic sequence by impulses generated by the preceding set and will complete one cycle for every two cycles completed by the preceding set.

3. A counter according to claim 2, in which the relay included in each cycle impulse generating means is the second impulse relay.

4. A counter according to claim 3, in which the electrical circuit included in each cycle impulse generating means is the control circuit.

5. A counter according to claim 2, comprising additionally a resetting means for resetting the relays in the second and subsequent sets to their initial position after each tenth pulse in the impulse receiving circuit.

6. A counter according to claim 5, in which said resetting means includes a resetting relay that is connected in an electrical circuit through a switch of the first impulse relay in the first set in its energized position and through a switch in series therewith of the holding relay in the fourth set in its released position, the resetting relay when so connected interrupting the control circuit in the second and subsequent sets of relays.

7. A counter according to claim 2 in which there are the following additional elements: a plurality of electrical indicating means, each of said means being selectively connected into an electrical circuit through a unique configuration of switches of the relays of said sets corresponding to the stored count at any given time.

8. A counter according to claim 7, in which one of the indicating means is connected into an electrical circuit through the following switches in series: a switch of the second impulse relay in the first set in its released position, a switch of the second control relay in the first set in its released position, a switch of the second control relay of the second set in its energized position, a switch of the first control relay of the fourth set in its released position, and a switch of the second control relay in the fourth set in its energized position, to indicate a unit stored count of one.

9. A counter according to claim 7, in which one of the indicating means is connected into an electrical circuit through the following switches in series: a switch of the second control relay in the third set in its energized position, a switch of the first control relay in the second set in its energized position, a switch of the second control relay in the first set in its energized position, and a switch of the second impulse relay in the first set in its released position, to indicate a unit stored count of two.

10. A counter according to claim 7, in which one of the indicating means is connected into an electrical circuit through the following switches in series: a switch of the holding relay in the third set in its energized position, a switch of the second control relay in the second set in its released position, a switch of the second control relay in the first set in its released position and a switch of the second impulse relay in the first set in its released position, to indicate a unit stored count of three.

11. A counter according to claim 7, in which one of the indicating means is connected into an electrical circuit through the following switches in series: a switch of the second control relay in the third set in its energized position, a switch of the first control relay in the second set in its energized position, a switch of the second control relay in the first set in its energized position and a switch of the second impulse relay in the first set in its released position, to indicate a unit stored count of four.

12. A counter according to claim 7, in which one of the indicating means is connected into an electrical circuit through the following switches in series: a switch of the first control relay in the fourth set in its energized position, a switch of the second control relay in the second set in its energized position, a switch of the second control relay in the first set in its released position, and a switch of the second impulse relay in the first set in its released position, to indicate a unit stored count of five.

13. A counter according to claim 7, in which one of the indicating means is connected into an electrical circuit through the following switches in series: a switch of the second control relay in the third set in its released position, a switch of the first control relay in the second set in its energized position, a switch of the second control relay in the first set in its energized position, and a switch of the second impulse relay in the first set in its released position, to indicate a unit stored count of six.

14. A counter according to claim 7, in which one of the indicating means is connected into an electrical circuit through the following switches in series: a switch of the holding relay in the third set in its released position, a switch of the second control relay in the second set in its released position, a switch of the second control relay in the first set in its released position, and a switch of the second impulse relay in the first set in its released position, to indicate a unit stored count of seven.

15. A counter according to claim 7, in which one of the indicating means is connected into an electrical circuit through the following switches in series: a switch of the holding relay in the fourth set in its energized position, a switch of the first control relay in the third set in its released position, a switch of the first control relay in the second set in its released position, a switch of the second control relay in the first set in its energized position, and a switch of the second impulse relay in the first set in its released position, to indicate a unit stored count of eight.

16. A counter according to claim 7, in which one of the indicating means is connected into an electrical circuit through the following switches in series: a switch of the second control relay in the fourth set in its released position, a switch of the first control relay in the fourth set in its released position, a switch of the second control relay in the second set in its energized position, a switch of the second control relay in the first set in its released position, and a switch of the second impulse relay in the first set in its released position, to indicate a unit stored count of nine.

17. A counter according to claim 7, in which one of the indicating means is connected into an electrical circuit through the following switches in series: a switch of the holding relay in the fourth set in its released position, a switch of the first control relay in the third set in its released position, a switch of the first control relay in the second set in its released position, a switch of the second control in the first set in its energized position, and a switch of the second impulse relay in the first set in its released position, to indicate a unit stored count of ten.

18. A counter for counting electrical impulses in an impulse receiving circuit: comprising a control circuit; a pluraliy of electromagnetic relays adapted to assume energized and released positions and provided with switch contacts for opening and closing electrical circuits in moving from one of those positions to the other; those relays including a pair of impulse relays and a pair of control relays and a holding relay; the second control relay being energized by the control circuit through series connected switch contacts of the first control relay and the first impulse relay when those relays are in their released positions; the second impulse relay being energized by a first pulse of current in the impulse receiving circuit through a switch contact of the first impulse relay in its released position; the holding relay being energized by the control circuit through series connected switch contacts of the first impulse relay in its released position and the second impulse relay in its energized position and remaining energized in holding circuit connection, after the second impulse relay has moved from its energized to its released position upon the ending of the first pulse of current in the impulse receiving circuit, through its own switch contact in series with a switch contact of the first impulse relay in its released position; the first control relay being energized by the control circuit through series connected switch contacts of both impulse relays in their released positions and a series connected switch contact of the holding relay in its energized position; and the first impulse relay being energized by a second pulse of current in the impulse receiving circuit through a switch contact of the second control relay in its released position, whereby each impulse relay will be energized alternately in cyclic sequence upon the occurrence of each electrical pulse in the impulse receiving circuit.

19. A counter for counting electrical impulses in an impulse receiving circuit: comprising a control circuit; a plurality of sets of electromagnetic relays adapted to assume energized and released positions and provided with switch contacts for opening and closing electrical circuits in moving from one of those positions to the other; each set of relays including a pair of impulse relays and a pair of control relays and a holding relay; the second control relay of each set being energized by the control circuit through series connected switch contacts of the first control relay of the same set and the first impulse relay of the same set when those relays are in their released positions; the second impulse relay of the first set being energized by a first pulse of current in the impulse receiving circuit through a switch contact of the first impulse relay of that set in its released position; the holding relays of each set being energized by the control circuit through series connected switch contacts of the first impulse relay of the same set in its released position and the second impulse relay of the same set in its energized position and remaining energized in holding circuit connection with the control circuit, after the second impulse relay of the same set has moved from its energized to its released position, through its own switch contact in series with a switch contact of the first impulse relay of the same set in its released position; the first control relay of each set being energized by the control circuit through series connected switch contacts of both impulse relays of the same set in their released positions and a series connected switch contact of the holding relay of the same set in its energized position; the first impulse relay of the first set being energized by a second pulse of current in the impulse receiving circuit through a switch contact of the second control relay of that set in its released position, whereby the impulse relays of the first set will be energized alternately in cyclic sequence completing one cycle upon the occurrence of every alternate electrical pulse in the impulse receiving circuit, impulse generating means for generating a new independent current pulse at the end of each cycle in the first set, the second impulse relay of the second set being energized by a first current pulse from the impulse generating means through a switch contact of the first impulse relay of that set in its released position; and the first impulse relay of the second set being energized by a second current pulse from the impulse generating means through a switch contact of the second control relay in that set in its released position, whereby the impulse relays of the second set will be energized alternately in cyclic sequence by pulses generated by the first set and will complete one cycle for every two cycles completed by the first set.

20. A counter according to claim 19, in which said impulse generating means includes the control circuit and a switch contact of the second impulse relay of the first set in its energized position.

21. A counter according to claim 20, in which there are four sets of relays, the second and third sets including a second and third impulse generating means respectively for energizing the impulse relays of the next succeeding set and the fourth set including resetting means for resetting all of the relays in the second and subsequent sets to their initial positions when the first impulse relay in the first set is energized following the release of the holding relay in the fourth set, whereby the counter will be reset after each tenth pulse in the impulse receiving circuit.

22. A counter according to claim 21, in which said resetting means includes a resetting relay for disconnecting the relays of the second and third sets from the control circuit, said resetting relay being energized through a switch contact of the first impulse relay of the first set in its energized position in series with a switch contact of the holding relay of the fourth set in its released position.

23. A counter according to claim 19, in which there are the following additional elements: a plurality of electrical indicating means for indicating the stored count at any given time, and decoding means for selectively energizing the indicating means in accordance with unique configurations of the relays in said sets corresponding to the stored count at any given time.

References Cited in the file of this patent

UNITED STATES PATENTS

| | | |
|---|---|---|
| 2,225,680 | Boswau | Dec. 24, 1940 |
| 2,277,579 | Burger | Mar. 24, 1942 |
| 2,364,540 | Luhn | Dec. 5, 1944 |
| 2,375,413 | Guenther | May 8, 1945 |
| 2,594,960 | May | Apr. 29, 1952 |
| 2,616,958 | Westerveld | Nov. 4, 1952 |